(12) United States Patent
Velusamy (10) Patent No.: US 10,716,019 B1
(45) Date of Patent: Jul. 14, 2020

(54) DUAL-SIM SIDE-BY-SIDE WIRELESS EXPERIENCE COMPARISON

(71) Applicant: T-Mobile USA, Inc., Bellevue, WA (US)

(72) Inventor: Senthil Kumar Mulluppadi Velusamy, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/541,014

(22) Filed: Aug. 14, 2019

(51) Int. Cl.
*H04W 24/06* (2009.01)
*H04W 24/02* (2009.01)
*H04W 8/18* (2009.01)
*H04W 88/06* (2009.01)

(52) U.S. Cl.
CPC ............ *H04W 24/06* (2013.01); *H04W 8/183* (2013.01); *H04W 24/02* (2013.01); *H04W 88/06* (2013.01)

(58) Field of Classification Search
CPC ..... H04W 24/06; H04W 8/183; H04W 24/02; H04W 88/06
See application file for complete search history.

(56) References Cited

U.S. PATENT DOCUMENTS

| | | | |
|---|---|---|---|
| 6,799,155 B1 * | 9/2004 | Lindemann | H04W 8/183 455/558 |
| 8,107,937 B2 * | 1/2012 | Jokinen | H04W 8/04 455/418 |
| 8,155,642 B2 * | 4/2012 | Russell | G01S 5/0252 455/432.1 |
| 8,380,180 B2 * | 2/2013 | Gnuschke | H04M 7/0069 370/352 |
| 8,965,366 B1 * | 2/2015 | Somayajula | H04W 60/00 370/328 |
| 9,100,966 B2 * | 8/2015 | Nousiainen | H04W 8/18 |
| 9,351,236 B2 * | 5/2016 | Fan | H04W 48/18 |
| 9,723,481 B2 * | 8/2017 | Schell | H04W 8/265 |
| 2010/0210304 A1 * | 8/2010 | Huslak | G06Q 10/10 455/558 |
| 2012/0196569 A1 * | 8/2012 | Holtmanns | H04L 63/0428 455/411 |
| 2014/0119345 A1 * | 5/2014 | Sikri | H04W 36/06 370/336 |

(Continued)

*Primary Examiner* — Julio R Perez
(74) *Attorney, Agent, or Firm* — Han Santos, PLLC (57) ABSTRACT

The network communication activity of a dual-subscriber identification module (SIM) user device is monitored as the dual-SIM user device communicates with a default wireless carrier network using a default SIM and a first baseband processor of the user device. A first set of key performance indicators (KPIs) for the network communication activity on the default wireless carrier network is determined. A simulation of the network communication activity on an alternative wireless carrier network is then initiated using an alternative SIM and a second baseband processor of the dual-SIM user device. A second set of KPIs for the simulation of the network communication activity on the alternative wireless carrier network is determined. The first and second set of KPIs are then compared to determine one or more network performance features of the alternative wireless carrier network that are superior to the corresponding network performance features of the default wireless carrier network.

20 Claims, 8 Drawing Sheets

(56) References Cited

U.S. PATENT DOCUMENTS

| | | | |
|---|---|---|---|
| 2014/0274006 A1* | 9/2014 | Mutya | H04W 36/14 455/416 |
| 2015/0017910 A1* | 1/2015 | Li | H04B 5/0031 455/41.1 |
| 2015/0017962 A1* | 1/2015 | Howard | H04M 1/72519 455/418 |
| 2016/0021660 A1* | 1/2016 | Krishnamurthy | H04W 72/0453 455/452.1 |
| 2016/0149605 A1* | 5/2016 | Vecera | H04B 1/3816 455/558 |
| 2017/0070346 A1* | 3/2017 | Lombardi | H04L 63/0428 |

* cited by examiner

DUAL-SIM SIDE-BY-SIDE WIRELESS EXPERIENCE COMPARISON

BACKGROUND

It is often difficult for users to determine whether an advertised performance of one wireless carrier network measures up to the performance of another wireless carrier network without interacting with both networks. Further, it is also difficult to have a side-by-side comparison of the network performances of two different wireless carrier networks without replicating the same network communication activity on each network under the same conditions. As a result, a wireless service subscriber who is generally satisfied with the performance of an existing wireless carrier network often has little incentive or motivation to switch to another wireless carrier network that may in fact offer a superior network experience.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques that enable a user to leverage a dual-Subscriber Identity Module (SIM) user device to make a side-by-side comparison of network performances offered by two wireless carrier networks. The dual-SIM user device may be a wireless communication device that is equipped with two SIMs and two baseband processors in a dual call/dual standby (DCDS) configuration. The DCDS configuration enables the dual-SIM user device to concurrently communicate with two different wireless carrier networks. A SIM in the dual-SIM user device may be a removable smart card SIM that fits into a SIM slot of the dual-SIM user device. Alternatively, or concurrently, the SIM may be an embedded Subscriber Identity Module (eSIM). The eSIM, also referred to as an embedded Universal Integrated Circuit Card (eUICC), may be mounted internally in the dual-SIM user device. For example, the eUICC is an integrated circuit that is not designed to be user removable, i.e., it may be mounted with or soldered to other electronic components of the user device. A SIM may contain a SIM profile that stores a unique international mobile subscriber identity (IMSI) number. In turn, the IMSI number may be used to authenticate a subscriber to a wireless carrier network. Other data that are stored in the SIM profile may include carrier network information, security authentication information, a list of accessible network services, and/or so forth. A SIM in the form of a smart card is generally capable of storing a single SIM profile, while an eSIM may be capable of storing multiple eSIM profiles.

Despite its dual-SIM capability, the dual-SIM user device is often equipped with just a single default SIM that is supplied by a default wireless carrier network. The default SIM may enable the dual-SIM user device to receive communication services from the default wireless carrier network via a first baseband processor of the dual-SIM user device. This partial use of the dual-SIM capability allows an operator of the alternative wireless carrier network to install an alternative SIM on the dual-SIM user device. The alternative SIM may enable the dual-SIM user device to concurrently communicate with the alternative wireless carrier network via a second baseband processor of the dual-SIM user device. In some instances, the installation of the alternative SIM may be achieved by providing a user of the dual-SIM user device with a smart card SIM that the user places into a SIM card slot of the dual-SIM user device. In other instances, the installation of the alternative SIM may be achieved by obtaining user authorization to download a corresponding eSIM profile into the eSIM of the dual-SIM user device. In this way, the alternative wireless carrier network may use the ability of the dual-SIM user device to concurrently communicate with two wireless carrier networks to provide a side-by-side network performance comparison of the alternative wireless carrier network to the default wireless carrier network.

In some embodiments, the alternative wireless carrier network may supply a comparison application that is installed on the dual-SIM user device with the permission of the user. The comparison application may monitor the network communication activity of the dual-SIM user device as the device communicates with the default wireless carrier network using the default SIM and the first baseband processor of the device. Based on the monitoring, the comparison application may determine a first set key performance indicators (KPIs) for the network communication activity on the default wireless carrier network. The comparison application further initiates a simulation of the same or similar network communication activity on the alternative carrier network using the alternative SIM and the second baseband processor to determine a second set of KPIs for the alternative wireless carrier network. The first and second sets of KPIs are then compared by the comparison application to determine one or more network performance features of the alternative wireless carrier network that are superior to the one or more corresponding network performance features of the default wireless carrier network. For example, the one or more superior network performance features may include a higher network data throughput rate, a lower network latency, a lower audio call drop rate, a higher network signal strength, etc., at one or more locations. Accordingly, the comparison application may present the one or more superior network performance features on a display of the dual-SIM user device. Alternatively, or concurrently, the comparison application may present at least one recommendation based on the one or more superior network performance features. For example, the recommendation may advise the user to switch from subscribing to the default wireless carrier network to subscribing to the alternative wireless carrier network.

In other embodiments, the comparison application may monitor the network communication activity of the dual-SIM user device as the device communicates with the default wireless carrier network using the default SIM and the first baseband processor of the device at one or more locations. Accordingly, the comparison application may determine a first set of KPIs for the default wireless carrier network at the one or more locations. Subsequently, the comparison application may use the alternative SIM and the second baseband processor to obtain a corresponding second set of KPIs for the one or more locations from a KPI database of the alternative carrier network. The first and second sets of KPIs are then compared by the comparison application to determine one or more network performance features of the alternative wireless carrier network that are superior to the one or more corresponding network performance features of the default wireless carrier network. Accordingly, the comparison application may present the one or more superior network performance features on a display of the dual-SIM user device. Alternatively, or concurrently, the comparison application may present at least one recommendation based on the one or more superior network performance features.

The ability of the alternative wireless carrier network to provide a side-by-side comparison of the network performances of the alternative wireless carrier and the default wireless carrier network may highlight the superior network performance features of the alternative wireless carrier network. Such superior network performance features may provide a subscriber with faster or more reliable telecommunication services, as well as monetary savings. Accordingly, the alternative wireless carrier network may motivate the subscriber to switch to using the telecommunication services of the alternative wireless carrier network. The techniques described herein may be implemented in a number of ways. Example implementations are provided below with reference to the following FIGS. 1-6.

Example Architecture

Figure 1:
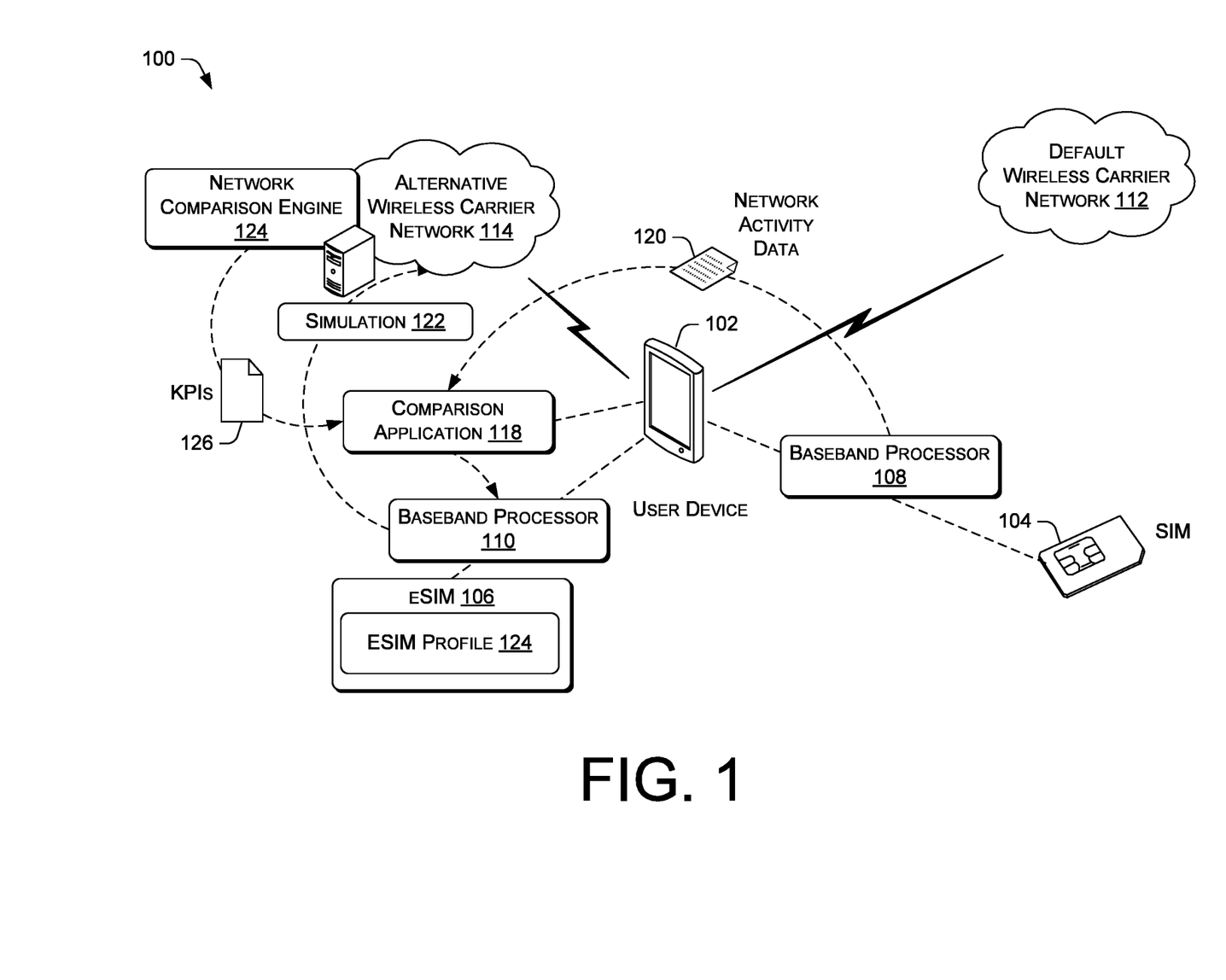
FIG. 1 illustrates an example architecture that enables the use of a dual-Subscriber Identity Module (SIM) user device to provide side-by-side wireless carrier network experience comparison.

FIG. 1 illustrates an example architecture 100 that enables the use of a dual-Subscriber Identity Module (SIM) user device to provide side-by-side wireless carrier network experience comparison. The dual-SIM user device 102 may be a smartphone, a smartwatch, a tablet computer, a phablet, or any other wireless communication device. The dual-SIM user device 102 may be equipped with dual removable smart card SIMs, dual embedded Subscriber Identity Modules (eSIMs), or a combination of one smart card SIM and one eSIM. A removable smart card SIM may fit into a SIM slot of the dual-SIM user device 102. An eSIM may be an embedded Universal Integrated Circuit Card (eUICC) that is mounted internally in the dual-SIM user device. Each of the SIM and eSIM may contain a SIM profile or an eSIM profile, respectively, that stores a unique international mobile subscriber identity (IMSI) number that authenticates a subscriber to a wireless carrier network. Other data that are stored in the SIM profile or eSIM profile may include carrier network information, security authentication information, a list of accessible network services, and/or so forth. A SIM in the form of a smart card is generally capable of storing a single SIM profile, while an eSIM may store multiple eSIM profiles. Further, one or more eSIM profiles may be downloaded into the eSIM as new eSIM profiles or updated eSIM profiles.

In other embodiments, an eSIM profile may be stored in a trusted environment of the dual-SIM user device 102. The trusted environment is an isolated execution space that is provided by dedicated software and/or hardware of the dual-SIM user device 102. For example, the trusted environment may employ a dedicated memory space or memory chip that is not accessible by applications and/or hardware components not located in the dedicated memory space or memory chip, unless such applications and/or hardware components are provided with special access privileges through secure communication channels and APIs. In alternative instances, the applications that reside in the trusted environment may be executed by a dedicated processor. The isolation of the trusted environment provides a high level of security for the execution of code or the processing of data stored in the execution space.

For the purpose of an illustrative example, the dual-SIM user device 102 is shown in FIG. 1 as being equipped with a SIM 104 and an eSIM 106. However, the dual-SIM user device 102 may be equipped with any two of SIMs or eSIMs. Thus, the SIM 104 may be substituted with an equivalent eSIM, and the eSIM 106 may be substituted with an equivalent SIM in alternative instances. Thus, for the purpose of simplifying the discussion, both SIM and eSIM may be referred to herein as SIM when convenient. The dual-SIM user device 102 is further equipped with a baseband processor 108 and a baseband processor 110. The baseband processors 108 and 110 and the two SIMs may be configured in a dual call/dual standby (DCDS) configuration. Accordingly, the baseband processor 108 and the SIM 104, also referred to as the default SIM 104, may be configured to enable the dual-SIM user device 102 to obtain wireless telecommunication services from the default wireless carrier network 112. For example, the SIM 104 may be supplied by the default wireless carrier network 112 for installation into the dual-SIM user device 102. Likewise, the baseband processor 110 and the eSIM 106, also referred to herein as the alternative SIM, may enable the dual-SIM user device 102 to obtain wireless telecommunication services from the alternative wireless carrier network 114. For example, a user of the dual-SIM user device 102 may configure the dual-SIM user device 102 to obtain wireless telecommunication services from the alternative wireless carrier network 114 by authorizing a download of an eSIM profile 116 to the eSIM 106.

In various embodiments, the dual-SIM user device 102 may be equipped with a comparison application 118. For example, the comparison application 118 may be an over-the-top (OTT) application that is supplied by the alternative wireless carrier network 114 or a third-party provider that is associated with the network. The comparison application 118 is downloaded and installed on the dual-SIM user device 102 with permission from the user of the dual-SIM user device 102. In operation, the comparison application 118 may monitor the network communication activity of the dual-SIM user device 102 as the device communicates with the default wireless carrier network 112 using the default SIM 104 and the baseband processor 108. For example, the network communication activity may include voice communication calls, download or upload of content, sending or receiving of messages (e.g., emails, text messages, multimedia messages, etc.), and/or other data exchanges. The comparison application 118 may perform monitoring of the network communication activity after obtaining consent from a user of the dual-SIM user device 102. For example, the comparison application 118 may present a consent interface on the display of the dual-SIM user device 102. The consent interface may enable the user to grant permission to the monitoring of network communication activity by providing an affirmative input, such as clicking on a checkbox, tapping a consent button, moving a virtual switch from an off position to an on position, and/or so forth.

The monitoring may enable the comparison application 118 to collect and analyze network activity data 120 for a predetermined time period to generate a first set of key performance indicators (KPIs) for the network communication activity on the default wireless carrier network. For example, the network activity data 120 may include information such as a number of IP data packets that are transmitted or received in a time frame, a source and/or a destination IP address of individual data packets, universal resource locators (URLs) associated with individual data packets, media access control (MAC) addresses associated with individual data packets, and/or other data traffic log data. The IP data packets may include voice call data packets, video stream data packets, audio stream data packets, multimedia stream data packets, etc. In some instances, the network activity data 120 may include network error events, such as data packet transmission retries, lost data packets, duplicate data packets, connection timeouts, and/or so forth. In additional instances, the network activity data 120 may further include system event data, bug reports, data packet traces, call logs, and/or so forth. Accordingly, the first set of KPIs that are generated by the comparison application 118 may include data throughput rates, network latency measurements, voice call drop rates, frequency of one-way audio events, web page load times, audio quality scores, network signal strength measurements, and/or so forth, for one or more time periods and/or one or more locations.

Further, the comparison application 118 may also use the network activity data 120 to initiate a simulation 122 of the same or similar network communication activity on the alternative wireless carrier network 114 using the alternative SIM 106 and the baseband processor 110. The simulation may be initiated in real-time or near real-time. For example, the comparison application 118 may use the baseband processor 110 to send or receive data packets from an identical IP address via the alternative wireless carrier network 114 based on the network activity data 120. In another example, the comparison application 118 may cause the baseband processor 110 to exchange dummy IMS voice communication data packets with a core network of the alternative wireless carrier network 114 to simulate a voice call. In some instances, the network activity data for the simulated network communication may also include network error events, system event data, bug reports, data packet traces, and/or so forth. By monitoring and analyzing the network activity data for the simulated network communication activity on the alternative wireless carrier network 114, the comparison application 118 may determine a second identical set of KPIs for the alternative wireless carrier network 114. The first and second sets of KPIs are then compared by the comparison application 118 to determine one or more network performance features of the alternative wireless carrier network 114 that are superior to the one or more corresponding network performance features of the default wireless carrier network 112. For example, the one or more superior network performance features may include a higher network data throughput rate, a lower network latency, a lower audio call drop rate, a higher network signal strength, etc., at one or more locations and/or at one or more time periods.

Accordingly, the comparison application 118 may present the one or more superior network performance features on a display of the dual-SIM user device 102. Alternatively, or concurrently, the comparison application 118 may present at least one recommendation based on the one or more superior network performance features. For example, the recommendation may advise the user to switch from subscribing to the default wireless carrier network 112 to subscribing to the alternative wireless carrier network 114. The recommendation may include information on one or more specific subscription plans that are offered by the alternative wireless carrier network, special offers or incentives that are available for a limited time, instructions and guides for initiate a switch, and/or so forth.

In other embodiments, the comparison application 118 may monitor the network communication activity of the dual-SIM user device 102 as the device communicates with the default wireless carrier network 112 using the default SIM 104 and the baseband processor 108 of the device at one or more locations. Accordingly, the comparison application 118 may determine a first set of KPIs for the default wireless carrier network at the one or more locations. Subsequently, the comparison application 118 may use the alternative SIM 106 and the baseband processor 110 to obtain a corresponding second set of KPIs for the one or more locations from a KPI database of the alternative wireless carrier network 114. For example, the comparison application 118 may transmit a request for one or more specific KPIs at a particular location to a network comparison engine 124 of the alternative wireless carrier network 114. Each of the locations may be expressed using geographical location coordinates (e.g., longitude, latitude, elevation), a street address, and/or so forth. In turn, the network comparison engine 124 may send the one or more specific KPIs, such as the KPIs 126, to the comparison application 118 via the alternative wireless carrier network 114.

The first and second sets of KPIs are then compared by the comparison application 118 to determine one or more network performance features of the alternative wireless carrier network 114 that are superior to the one or more corresponding network performance features of the default wireless carrier network 112. Accordingly, the comparison application 118 may present the one or more superior network performance features on a display of the dual-SIM user device 102. Alternatively, or concurrently, the comparison application 118 may present at least one recommendation based on the one or more superior network performance features.

Example Dual-SIM User Device

Figure 2:
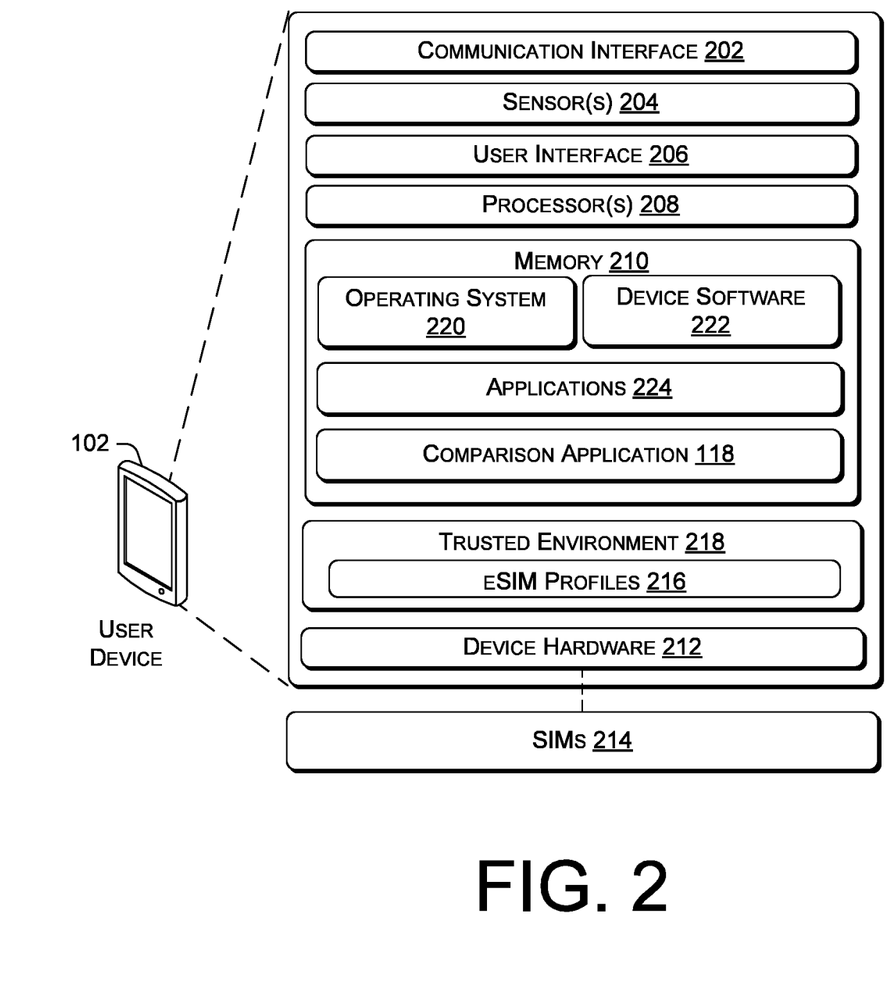
FIG. 2 is a block diagram showing various components of an illustrative dual-SIM user device that provides side-by-side wireless carrier network experience comparison.

FIG. 2 is a block diagram showing various components of an illustrative dual-SIM user device that provides side-by-side wireless carrier network experience comparison. The dual-SIM user device 102 may include a communication interface 202, one or more sensors 204, a user interface 206, one or more processors 208, memory 210, and device hardware 212. The communication interface 202 may include wireless and/or wired communication components that enable the electronic device to transmit or receive voice or data communication via the wireless carrier network, as well as other telecommunication and/or data communication networks. The sensors 204 may include a proximity sensor, a compass, an accelerometer, biometric sensors, cameras, and/or a global positioning system (GPS) sensor, among other appropriate sensors. The proximity sensor may detect the movement of objects that are proximate to the dual-SIM user device 102. The compass, the accelerometer, and the GPS sensor may detect orientation, movement, and geographical location of the dual-SIM user device 102. The cameras may capture images of the environment around the dual-SIM user device 102.

The user interface 206 may enable a user to provide inputs and receive outputs from the dual-SIM user device 102. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 212 may include baseband processors, also referred to as cellular modems, that enable the dual-SIM user device 102 to perform telecommunication and data communication with various wireless carrier networks, as well as a short-range transceiver that enables the device to connect to other devices via short-range wireless communication links. The device hardware 212 may further include signal converters, antennas, hardware decoders and encoders, graphics processors, and/or the like that enable the dual-SIM user device 102 to execute applications and provide telecommunication and data communication functions. The baseband processors may be driven by modem software to perform telecommunication and data communication with a wireless communication network. The modem software may be firmware that is stored in dedicated non-volatile memory of the dual-SIM user device 102. Such non-volatile memory may include read-only memory (ROM), erasable programmable read-only memory (EPROM), or flash memory. The user device is further equipped with SIMs 214 that store multiple eSIM profiles. The SIMs 214 may include dual removable smart card SIMs, dual embedded Subscriber Identity Modules (eSIMs), or a combination of one smart card SIM and one eSIM. In some alternative embodiments, one or more eSIM profiles 216 may be instead stored in a trusted environment 218. The one or more processors 208 and the memory 210 may implement the trusted environment 218. The trusted environment 218 is an isolated execution space that is provided by dedicated software and/or hardware of a device.

The one or more processors 208 and the memory 210 of the dual-SIM user device 102 may implement an operating system 220, device software 222, one or more applications 224, and the comparison application 118. Such software may include routines, program instructions, objects, and/or data structures that are executed by the processors 208 to perform particular tasks or implement particular abstract data types.

The operating system 220 may include components that enable the dual-SIM user device 102 to receive and transmit data via various interfaces (e.g., user controls, communication interface 202, and/or memory input/output devices). The operating system 220 may also process data using the one or more processors 208 to generate outputs based on inputs that are received via the user interface 206. For example, the operating system 220 may provide an execution environment for the execution of the applications 224. The operating system 220 may include a presentation component that presents the output (e.g., display the data on an electronic display, store the data in memory, transmit the data to another electronic device, etc.).

The operating system 220 may include an interface layer that enables applications to interface with the modem and/or the communication interface 202. The interface layer may comprise public APIs, private APIs, or a combination of both public APIs and private APIs. Additionally, the operating system 220 may include other components that perform various other functions generally associated with an operating system. The device software 222 may include software components that enable the user device to perform functions. For example, the device software 222 may include basic input/output system (BIOS), bootrom, or a bootloader that boots up the dual-SIM user device 102 and executes the operating system 220 following power-up of the device.

The applications 224 may include applications that provide utility, entertainment, and/or productivity functionalities to a user of the dual-SIM user device 102. For example, the applications 224 may include telephony applications, electronic mail applications, remote desktop applications, web browser applications, navigation applications, office productivity applications, multimedia streaming applications, an online shopping application, and/or so forth.

The comparison application 118 may be configured to receive network activity data (e.g., network activity data 120) by interfacing with the modem software of the baseband processors, such as the baseband processor 108, and/or by interfacing with the operating system 220 of the dual-SIM user device 102. Further, the comparison application 118 may have the ability to switch between using the baseband processor 108/SIM 104 combination and using the baseband processor 110/SIM 106 for incoming and outgoing data communications by interacting with the modem software of the baseband processors (e.g., sending commands or APIs calls).

In various embodiments, the comparison application 118 may execute one or more preconfigured comparison tests according to a predetermined test schedule. For a comparison test, the comparison application 118 may monitor network activity data of real and simulated network communication traffic to derive corresponding KPIs for different wireless carrier networks. Further, the comparison application 118 may compare a first set of KPIs that are obtained for the default wireless carrier network 112 to a second set of KPIs that are obtained for the alternative wireless carrier network 114. Such monitoring and comparison may be performed with respect to one or more locations and/or for a particular time interval for each comparison test. In some instances, such comparison may indicate that one or more network performance features of the alternative wireless carrier network 114 are superior to the one or more corresponding network performance features of the default wireless carrier network 112. In such instances, the comparison application 118 may present the one or more superior network performance features on a display of the dual-SIM user device 102. Alternatively, or concurrently, the comparison application 118 may present at least one recommendation based on the one or more superior network performance features.

In some embodiments, a comparison test may include the comparison application 118 determining whether one or more service enhancement features of the alternative wireless carrier network 114 fit the network communication activity of the dual-SIM user device 102 in a particular time period. In such embodiments, the service enhancement features may include unlimited domestic calling, unlimited international calling, unlimited texting, unlimited data communication, free or discounted media content streaming from a specific content stream provider, scam call alerting, and/or so forth. For example, the alternative wireless carrier network 114 may be equipped with a scam alert service that is capable of identifying phone calls originating from certain telephone numbers as being scam calls. Thus, the comparison application 118 may determine from the network communication activity, e.g., a call log, that the number of scam calls received by the dual-SIM user device 102 in a predetermined time period exceeds a percentage or numerical threshold. In such a scenario, the comparison application 118 may decide that the scam alert service fits the network communication activity of the dual-SIM user device 102. As such, the comparison application 118 may present the scam alert capability of the alternative wireless network 114 as a service enhancement feature. In another example, the comparison application 118 may determine that the network communication activity indicates that an amount of media content streamed from a media provider to the dual-SIM user device 102 exceeds a predetermined amount threshold. Alternatively, the comparison application 118 may determine from the network communication activity that an amount of time that the media content is streamed from the media provider to the dual-SIM user device 102 in a predetermined time interval exceeds a percentage threshold. In these scenarios, the comparison application 118 may present a free or discounted media multimedia service of the alternative wireless carrier network 114 as a service enhancement feature.

In additional examples, the comparison application 118 may determine a data or voice communication usage pattern of the user from the network communication activity, such as an amount of domestic or international call time consumed, an amount of text messages sent, or an amount of data downloaded in a predetermined time period. Accordingly, the comparison application 118 may present a service subscription plan that offers unlimited domestic calling, unlimited international calling, unlimited texting, and/or unlimited data communication as a service enhancement feature.

In other embodiments, the comparison application 118 may offer a limited service subscription plan as a service enhancement feature. In such embodiments, the comparison application 118 may determine from a comparative analysis of KPIs associated with the network communication activity of the dual-SIM user device 102 that the default wireless carrier network 112 provides inferior network performance to the alternative wireless carrier network 114 at a particular geographical location while the two networks offer comparable performance at other geographical locations. For example, the default wireless carrier network 112 may suffer from a lower network signal strength, a higher call drop rate, and/or a lower data throughput rate than the alternative wireless carrier network 114 at a particular geographical location. Accordingly, the comparison application 118 may offer a limited service subscription plan that provides the dual-SIM user device 102 with an option to switch from using the default wireless carrier network 112 to using the alternative wireless carrier network 114 while the user device is located within a predetermined distance of the geographical location. In other words, the dual-SIM user device 102 may switch from using the baseband processor 108 and the SIM 104 to communicate with the default wireless carrier network 112 to using the baseband processor 110 and the SIM 106 to communicate with the alternative wireless carrier network 114.

For example, when the comparison application 118 detects via a GPS sensor of the dual-SIM user device 102 that the user device is within a predetermined distance of the particular geographical location, the comparison application 118 may present an option to switch from using the default wireless carrier network 112 to using the alternative wireless carrier network 114 via an options interface. The options interface may be presented via a display of the dual-SIM user device 102. Accordingly, the comparison application 118 may perform such a switch after the user inputs consent. The dual-SIM user device 102 may switch back to using the default wireless carrier network 112 when the user revokes consent via the options interface or when dual-SIM user device 102 moves farther than the predetermined distance from the geographical location. However, in some instances, the options interface may include an option that can be selected to automatically switch the dual-SIM user device 102 to using the alternative wireless carrier network 114 whenever the user device is within the predetermined distance of the particular geographical location, and vice versa. In various instances, the limited service subscription plan may be a monthly flat fee plan or a pay-per-use metered data/voice usage plan.

Example Network Comparison Components

Figure 3:
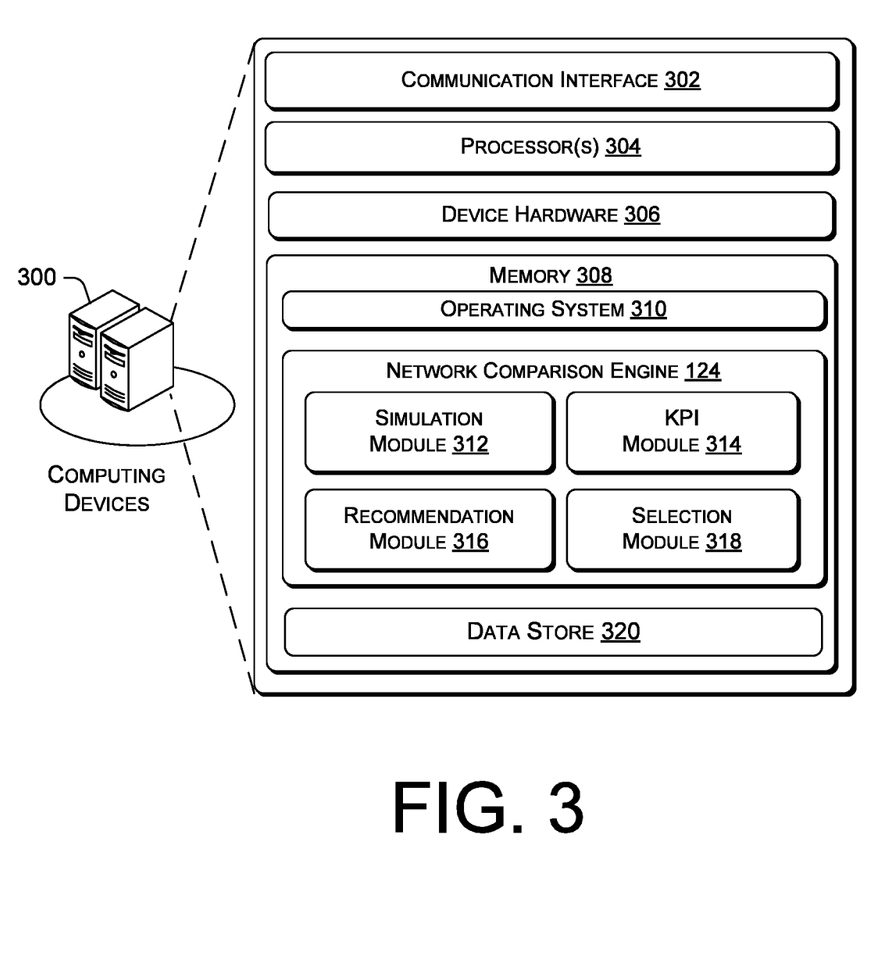
FIG. 3 is a block diagram showing various components of one or more illustrative computing devices that support side-by-side wireless carrier network experience comparison.

FIG. 3 is a block diagram showing various components of one or more illustrative computing devices that support side-by-side wireless carrier network experience comparison. The computing devices 300 may include a communication interface 302, one or more processors 304, memory 306, and device hardware 308. The communication interface 302 may include wireless and/or wired communication components that enable the computing devices 300 to transmit data to and receive data from other networked devices. The device hardware 308 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 300 or components thereof may be virtual computing devices in the form of virtual machines or software containers that are hosted in a computing cloud.

The computing devices 300 may implement an operating system 310 and a network comparison engine 124. The operating system 310 may include components that enable the computing devices 300 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system. The operating system 310 may support the operations of the network comparison engine 124.

The network comparison engine 124 may include a simulation module 312, a KPI module 314, a recommendation module 316, and a selection module 318. Such modules may include routines, program instructions, objects, and/or data structures that are executed by the processors 304 to perform particular tasks or implement particular abstract data types.

The simulation module 312 may receive data packet uploads of simulated data traffic from the comparison application 118. In turn, the simulation module 312 may route the data packets to the appropriate destination network addresses. Further, the simulation module 312 may pass data packets of simulated download traffic to the comparison application 118. In other embodiments, the simulation module 312 may route dummy IMS voice communication data packets between the dual-SIM user device 102 and the core network of the alternative wireless carrier network 114 to simulate a voice call.

The KPI module 314 may provide KPIs of the alternative wireless carrier network 114 for various geographical locations to the comparison application 118. In various embodiments, the KPI module 314 may receive a request for one or more KPIs that are associated with a specific geographical location from the comparison application 118. In turn, the comparison application 118 may retrieve the one or more KPIs from a KPI database maintained in the data store 320. For example, the data store 320 may include one or more databases, such as relational databases, object databases, object-relational databases, and/or key-value databases that store the KPIs.

The recommendation module 316 may provide the comparison application 118 with updates to the recommendations that are surfaced by the application. In some instances, the updates may include updates to the language of the recommendation, updates to the plan information (e.g., cost, restrictions, details, etc.) of the subscription plans that are recommended. In other instances, the updates may include updates to service enhancement features that can be presented based on the monitored network communication activity. The updates may include updates to the thresholds or criteria for presenting the service enhancement features (e.g., thresholds for amounts of data used, voice call minutes used, etc.).

The selection module 318 may interact with a billing function to bill a subscription account that belongs to the user of the dual-SIM user device 102 for subscribing to a limited subscription plan. For example, the billing function may be an Online Charging System (OCS) or another equivalent core network component of the alternative wireless carrier network 114. In some instances, the user may input information for establishing a subscription account via an account setup interface presented by the comparison application 118. The comparison application 118 may send the information to the selection module 318. In turn, the selection module 318 may trigger the billing function to establish the subscription account for the user based on the information. For example, the limited subscription plan may enable the user to switch over to using the alternative wireless carrier network 114 at certain geographical locations on a flat fee basis or a pay-per-use basis.

In some embodiments, the network comparison engine 124 may have access to a scam alert service of the alternative wireless carrier network 114. Accordingly, the comparison application 118 may send a call log of the dual-SIM user device 102 to the network comparison engine 124. The call log may include a list of incoming call telephone numbers for a predetermined time period. In turn, the network comparison engine 124 may forward the call log to the scam alert service. The scam alert service may compare the list of telephone numbers to a list of known scam telephone numbers that are stored in a database of the alternative wireless carrier network 114. Based on the comparison, the scam alert service may determine whether a number of scam telephone numbers in the call log exceeds a threshold. For example, the threshold may be a percentage threshold or a numerical threshold. Thus, the network comparison engine 124 may notify the comparison application 118 whether the threshold is exceeded by the incoming call telephone numbers contained in the call log.

Example Processes

Figure 4A:
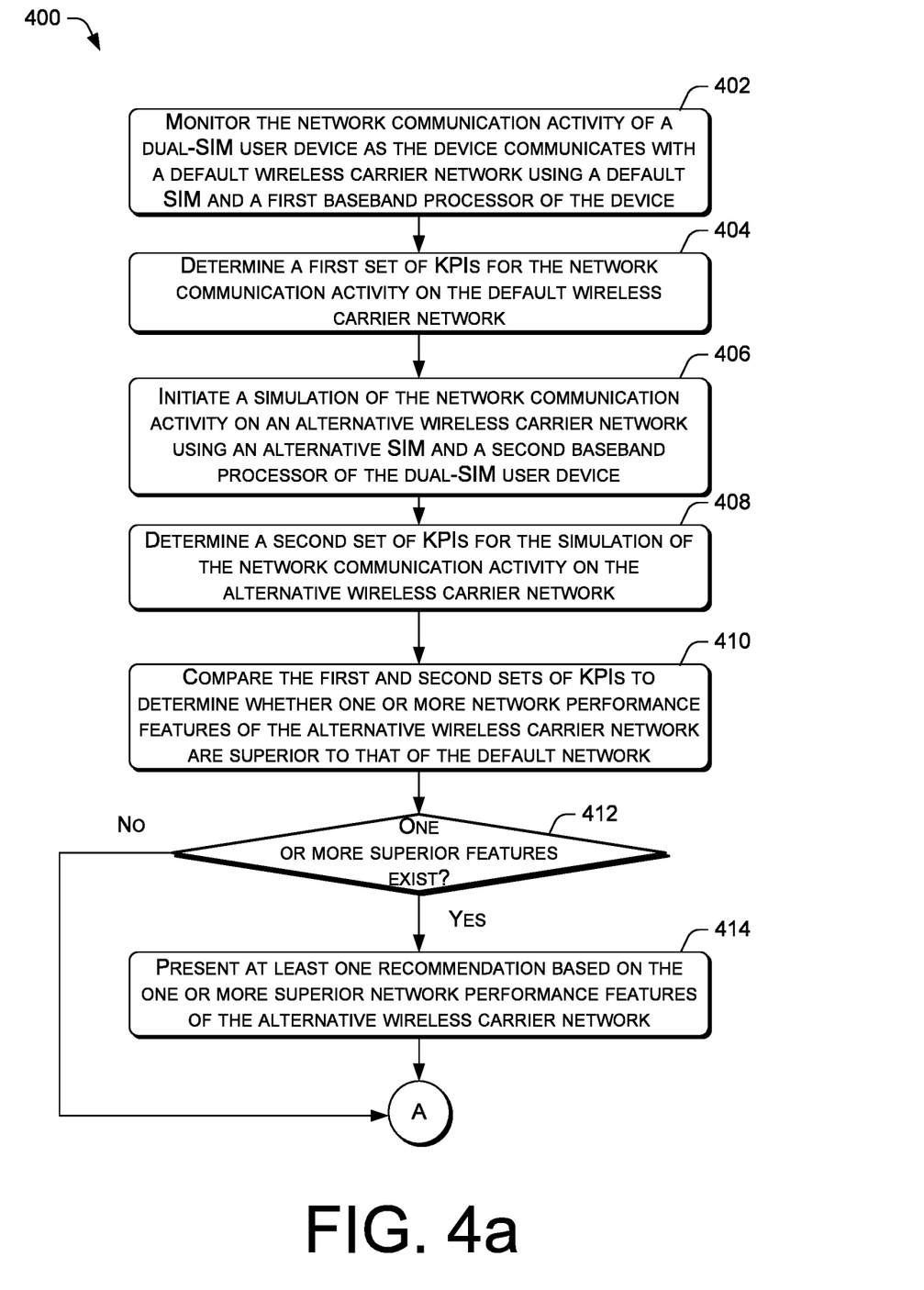
FIGS. 4a and 4b illustrate a flow diagram of an example process for using simulated network communication activity to provide a side-by-side comparison of the network experience offered by a default wireless carrier network and an alternative wireless carrier network.
Figure 4B:
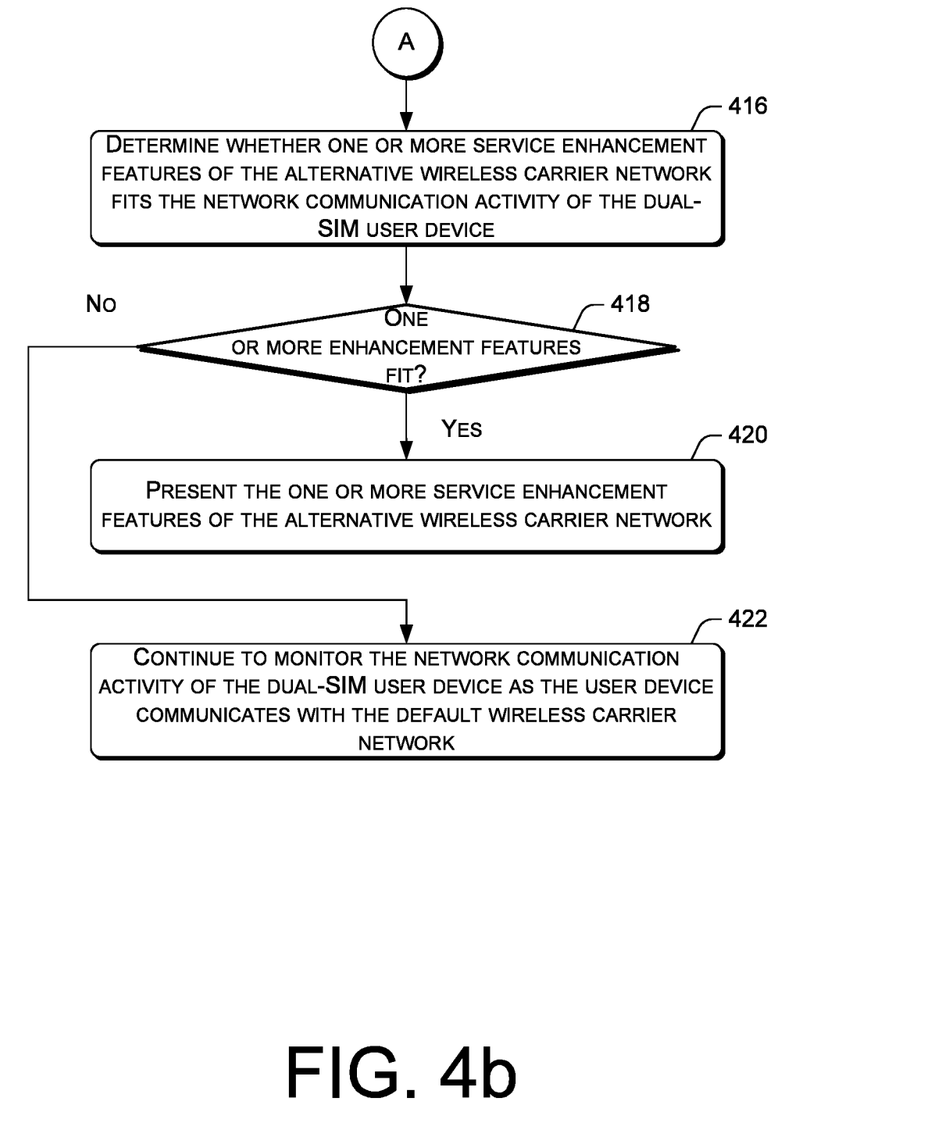
Figure 5A:
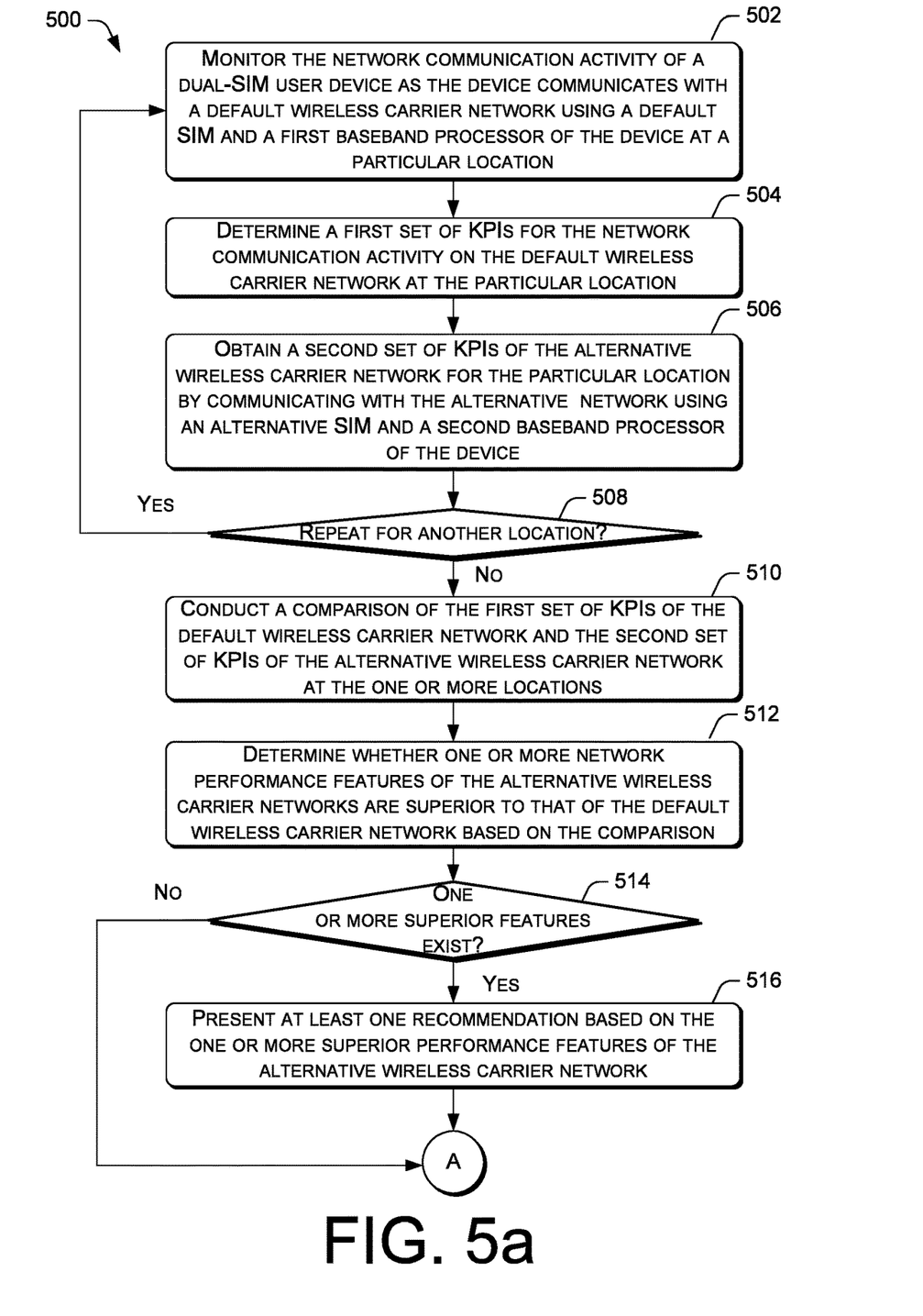
FIGS. 5a and 5b illustrate a flow diagram of an example process for using network KPI data of an alternative wireless carrier network to provide a side-by-side comparison of the network experience offered by a default wireless carrier network and the alternative wireless carrier network.
Figure 5B:
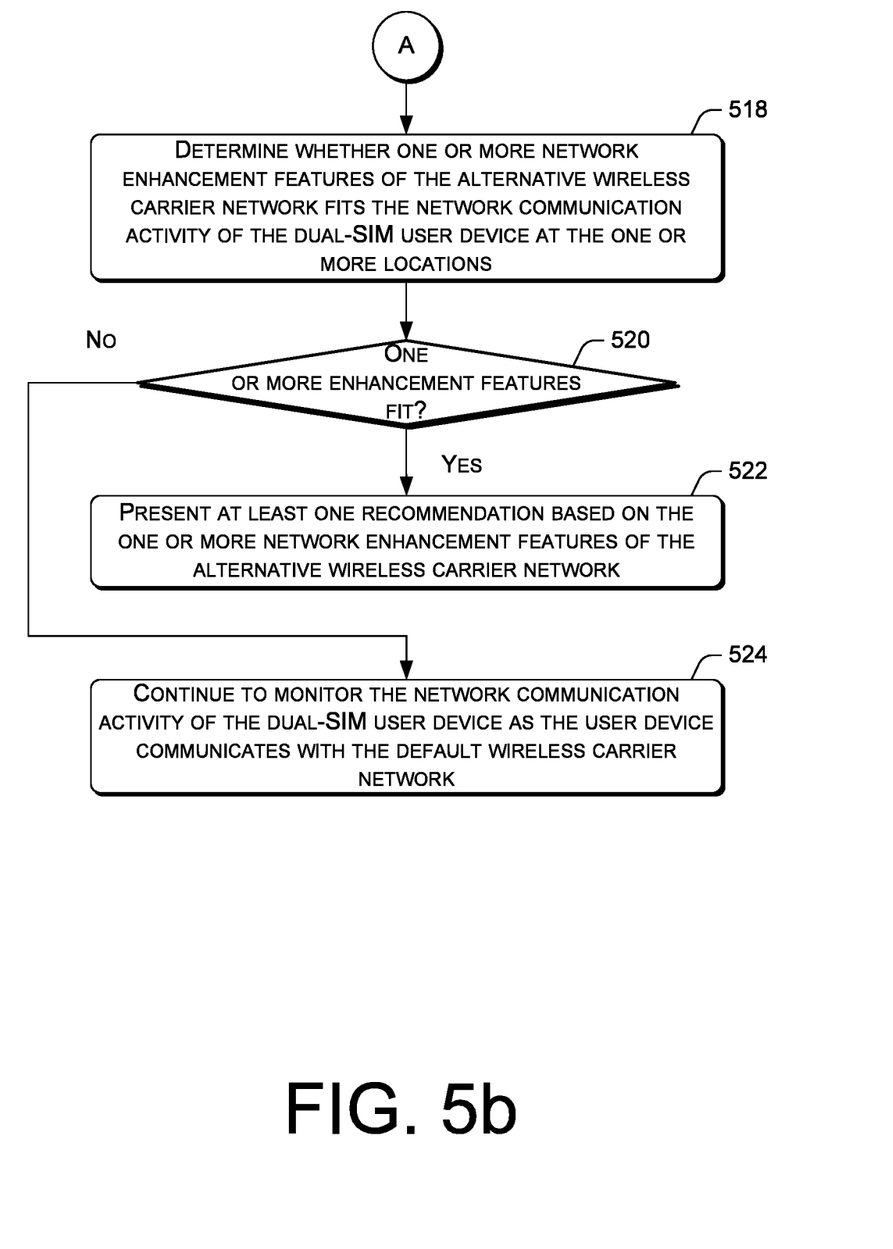
Figure 6:
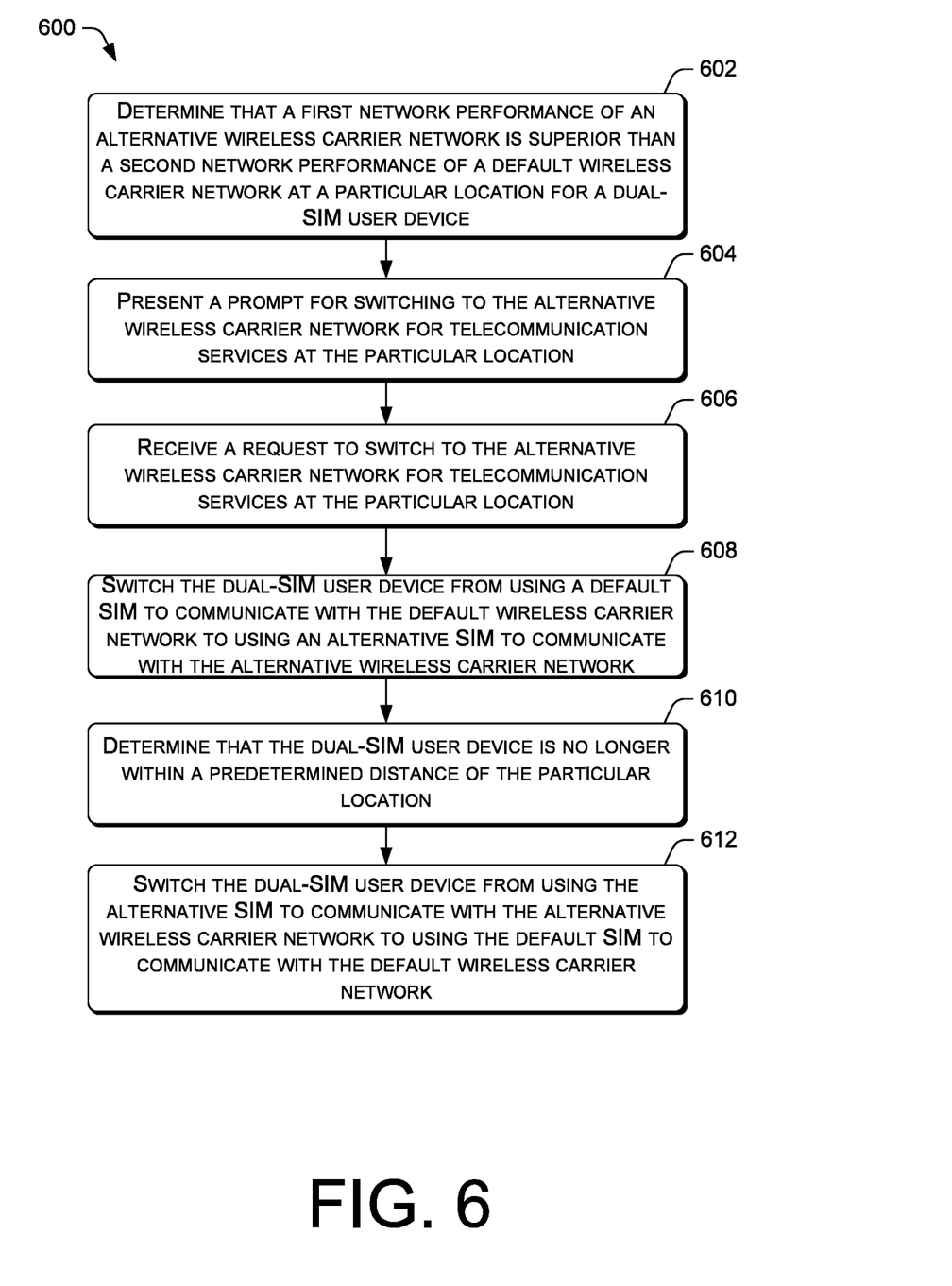
FIG. 6 is a flow diagram of an example process for prompting a user to initiate a localized switching of a dual-SIM user device from using a default wireless carrier network to using an alternative carrier network.

FIGS. 4-6 present illustrative processes 400-600 for using a dual-SIM user device to provide side-by-side wireless carrier network experience comparison. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the architecture 100 of FIG. 1.

FIGS. 4a and 4b illustrate a flow diagram of an example process 400 for using simulated network communication activity to provide a side-by-side comparison of the network experience offered by a default wireless carrier network and an alternative wireless carrier network. At block 402, the comparison application 118 may monitor the network communication activity of the dual-SIM user device 102 as the user device communicates with the default wireless carrier network 112 using a default SIM (e.g., the SIM 104) and a first baseband processor (e.g., the baseband processor 108) of the user device.

At block 404, the comparison application 118 may determine a first set of KPIs for the network communication activity on the default wireless carrier network 112. In various embodiments, the comparison application 118 may monitor the network communication activity associated with the first baseband processor for a predetermined time period, and then generate the first set of KPIs based on the network communication activity. At block 406, the comparison application 118 may initiate a simulation of the network communication activity on the alternative wireless carrier network 114 using an alternative SIM (e.g., SIM 106) and a second baseband processor (e.g., the baseband processor 110). In various embodiments, the simulation may be initiated in real-time or near real-time. For example, the comparison application 118 may use the second baseband processor to send or receive data packets from an identical IP address via the alternative wireless carrier network 114. In another example, the comparison application 118 may cause the second baseband process to exchange dummy IMS voice communication data packets with a core network of the alternative wireless carrier network 114 to simulate a voice call.

At block 408, the comparison application 118 may determine a second set of KPIs for the simulation of the network communication activity on the alternative wireless carrier network 114. In various embodiments, the comparison application 118 may monitor the network communication activity associated with the second baseband processor during a simulation period that corresponds to the predetermined time period, and then generate the second set of KPIs based on the network communication activity.

At block 410, the comparison application 118 may compare the first and the second KPIs to determine whether one or more network performance features of the alternative wireless carrier network 114 are superior to that of the default wireless carrier network 112. For example, the one or more superior network performance features may include a higher network data throughput rate, a lower network latency, a lower audio call drop rate, a higher network signal strength, etc., at one or more locations.

At decision block 412, if one or more superior network performance features exist, the process 400 may proceed to block 414. At block 414, the comparison application 118 may present at least one recommendation based on the one or more superior network performance features of the alternative wireless carrier network 114. For example, a recommendation may advise the user to switch from subscribing to the default wireless carrier network to subscribing to the alternative wireless carrier network. The comparison application 118 may present the recommendation via a display of the dual-SIM user device 102. In some embodiments, the comparison application 118 may present the one or more superior network features in conjunction with or independently of the at least one recommendation. Subsequently, the process 400 may proceed to block 416.

Returning to decision block 412, if no superior network performance feature exists, the process 400 may proceed directly to block 416. At block 416, the comparison application 118 may determine whether one or more service enhancement features of the alternative wireless carrier network 114 fit the network communication activity of the dual-SIM user device 102. For example, the service enhancement features may include unlimited domestic calling, unlimited international calling, unlimited texting, unlimited data communication, free or discounted media content streaming from a specific content stream provider, scam call alerting, and/or so forth.

At decision block 418, if the one or more service enhancement features fit the network communication activity, the process 400 may proceed to block 420. At block 420, the comparison application 118 may present the one or more service enhancement features of the alternative wireless carrier network 114. In various embodiments, the comparison application 118 may present the one or more service enhancement features via a display of the dual-SIM user device 102.

However, if no service enhancement feature of the alternative wireless carrier network 114 fits the network communication activity, the process 400 may proceed to block 422. At block 422, the comparison application 118 may continue to monitor the network communication activity of the dual-SIM user device 102 as the user device communicates with the default wireless carrier network 112.

FIGS. 5a and 5b illustrate a flow diagram of an example process 500 for using network KPI data of an alternative wireless carrier network to provide a side-by-side comparison of the network experience offered by a default wireless carrier network and the alternative wireless carrier network. At block 502, the comparison application 118 may monitor the network communication activity of the dual-SIM user device 102 as the user device communicates with the default wireless carrier network 112 using a default SIM (e.g., the SIM 104) and a first baseband processor (e.g., the baseband processor 108) of the user device at a particular location.

At block 504, the comparison application 118 may determine a first set of KPIs for the network communication activity of the default wireless carrier network at the particular location. In various embodiments, the comparison application 118 may monitor the network communication activity associated with the first baseband processor for a predetermined time period, and then generate the first set of KPIs based on the network communication activity. At block 406, the comparison application 118 may obtain a second set of KPIs of the alternative wireless carrier network 114 for the particular location using an alternative SIM (e.g., the SIM 106) and a second baseband processor (e.g., the baseband processor 110). In various embodiments, the comparison application 118 may use the alternative SIM and the second baseband processor to send a request for the second set of KPIs to a network comparison engine 124 of the alternative wireless carrier network 114. In turn, the network comparison engine 124 may send the second set of KPIs to the comparison application 118.

At decision block 508, the comparison application 118 may determine whether the monitoring of the network communication activity of the dual-SIM user device 102 for KPI comparison purposes is to be repeated for another location. In various embodiments, the comparison application 118 may repeat the monitoring and KPI comparison for another location when a time duration for a specific comparison test has not elapsed or a predetermined number of locations for the specific comparison test has not been reached. Thus, if the monitoring and comparison are to be repeated for another location, the process 500 may loop back to block 502. However, if the monitoring and comparison are not to be repeated, the process 500 may proceed to block 510. At block 510, the comparison application 118 may conduct a comparison of the first set of KPIs of the default wireless carrier network 112 to the second set of KPIs of the alternative wireless carrier network 114 at the one or more locations. At block 512, the comparison application 118 may determine whether one or more network performance features of the alternative wireless carrier network 114 are superior to that of the default wireless carrier network 112 based on the comparison. For example, the one or more superior network performance features may include a higher network data throughput rate, a lower network latency, a lower audio call drop rate, a higher network signal strength, etc., at one or more locations.

At decision block 514, if one or more superior network performance features exist, the process 500 may proceed to block 516. At block 516, the comparison application 118 may present at least one recommendation based on the one or more superior network performance features of the alternative wireless carrier network 114. For example, a recommendation may advise the user to switch from subscribing to the default wireless carrier network to subscribing to the alternative wireless carrier network. The comparison application 118 may present the recommendation via a display of the dual-SIM user device 102. In some embodiments, the comparison application 118 may present the one or more superior network features in conjunction with or independently of the at least one recommendation.

Subsequently, the process 500 may proceed to block 518. Returning to decision block 514, if no superior network performance feature exists, the process 500 may proceed directly to block 518. At block 518, the comparison application 118 may determine whether one or more service enhancement features of the alternative wireless carrier network 114 fit the network communication activity of the dual-SIM user device 102. For example, the service enhancement features may include unlimited domestic calling, unlimited international calling, unlimited texting, unlimited data communication, free or discounted media content streaming from a specific content stream provider, scam call alerting, and/or so forth.

At decision block 520, if the one or more service enhancement features fit the network communication activity, the process 500 may proceed to block 522. At block 522, the comparison application 118 may present the one or more service enhancement features of the alternative wireless carrier network 114. In various embodiments, the comparison application 118 may present the one or more service enhancement features via a display of the dual-SIM user device 102.

However, if no service enhancement feature of the alternative wireless carrier network 114 fits the network communication activity, the process 500 may proceed to block 524. At block 524, the comparison application 118 may continue to monitor the network communication activity of the dual-SIM user device 102 as the user device communicates with the default wireless carrier network 112.

FIG. 6 is a flow diagram of an example process 600 for prompting a user to initiate a localized switching of a dual-SIM user device from using a default wireless carrier network to using an alternative carrier network. At block 602, the comparison application 118 on the dual-SIM user device 102 may determine that a first network performance of the alternative wireless carrier network 114 is superior to a second network performance of the default wireless carrier network 112 at a particular location for the dual-SIM user device 102. For example, the alternative wireless carrier network may provide a higher network data throughput rate, a lower network latency, a lower audio call drop rate, and/or a higher network signal strength than the default wireless carrier network at the particular location.

At block 604, the comparison application 118 may present a prompt for switching from the default wireless carrier network 112 to the alternative wireless carrier network 114 for communication services at the particular location. In various embodiments, the comparison application 118 may present the prompt via an options interface when a GPS sensor of the dual-SIM user device 102 detects that the device is within a predetermined distance of the particular location. The options interface may be presented via a display of the dual-SIM user device 102.

At block 606, the comparison application 118 may receive a request to switch to the alternative wireless carrier network for telecommunication services at the particular location. In various embodiments, a user of the dual-SIM user device 102 may input the request via the options interface that is presented via the display of the dual-SIM user device 102. At block 608, the comparison application 118 may switch the dual-SIM user device 102 from using a default SIM (e.g., the SIM 104) to communicate with the default wireless carrier network 112 to using an alternative SIM (e.g., the SIM 106) to communicate with the alternative wireless carrier network 114. In various embodiments, the default SIM may communicate with the default wireless carrier network 112 via the first baseband processor (e.g., the baseband processor 108). Likewise, the alternative SIM may communicate with the alternative wireless carrier network 114 via the second baseband processor (e.g., the baseband processor 110).

At block 610, comparison application 118 may determine that the dual-SIM is no longer within a predetermined distance of the particular location. At block 612, the comparison application 118 may switch the dual-SIM user device 102 from using the alternative SIM (e.g., the SIM 106) to communicate with the alternative wireless carrier network 114 to using the default SIM (e.g., the SIM 104) to communicate with the default wireless carrier network 112.

The ability of the alternative wireless carrier network to provide a side-by-side comparison of the network performances of the alternative wireless carrier and the default wireless carrier network may highlight the superior network performance features of the alternative wireless carrier network. Such superior network performance features may provide a subscriber with faster or more reliable telecommunication services, as well as monetary savings. Accordingly, the alternative wireless carrier network may motivate the subscriber to switch to using the telecommunication services of the alternative wireless carrier network.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a dual-subscriber identification module (SIM) user device storing computer-executable instructions that upon execution cause one or more processors to perform acts comprising:

monitoring network communication activity of the dual-SIM user device as the dual-SIM user device communicates with a default wireless carrier network using a default SIM and a first baseband processor of the user device, the network communication activity including a download or an upload of IP data packets by the first baseband processor;

determining a first set of key performance indicators (KPIs) for the network communication activity on the default wireless carrier network;

initiating a simulation of the network communication activity on an alternative wireless carrier network by repeating the download or the upload on the alternative wireless carrier network using equivalent dummy IP data packets via an alternative SIM and a second baseband processor of the dual-SIM user device;

determining a second set of KPIs for the simulation of the network communication activity on the alternative wireless carrier network; and comparing the first and second set of KPIs to determine one or more network performance features of the alternative wireless carrier network that are superior to the corresponding network performance features of the default wireless carrier network.

2. The one or more non-transitory computer-readable media of claim 1, wherein the acts further comprise at least one of:

presenting the one or more network performance features of the alternative wireless carrier network that are superior on a display of the dual-SIM user device; or presenting at least one recommendation based on the one or more performance features of the alternative wireless carrier network on the display of the dual-SIM user device.

3. The one or more non-transitory computer-readable media of claim 2, wherein the one or more network performance features that are superior include a higher network data throughput rate, a lower network latency, a lower audio call drop rate, or a higher network signal strength at one or more locations, and the at least one recommendation includes a recommendation to subscribe to the alternative wireless carrier network.

4. The one or more non-transitory computer-readable media of claim 3, wherein the at least one recommendation includes a recommendation to subscribe to the alternative wireless carrier network for use at one or more locations where the one or more network performance features of the alternative wireless carrier network are superior.

5. The one or more non-transitory computer-readable media of claim 1, wherein the IP data packets include a voice call data packet, a video stream data packet, an audio stream data packet, or a multimedia stream data packet.

6. The one or more non-transitory computer-readable media of claim 1, wherein the acts further comprise:

determining one or more service enhancement features of the alternative wireless carrier network fit the network communication activity of the dual-SIM user device; and presenting at least one recommendation based on the one or more service enhancement features.

7. The one or more non-transitory computer-readable media of claim 6, wherein the determining the one or more service enhancement features includes determining that an unlimited data or voice calling service, a scam call alert service, or a bundled free media content streaming service fits the network communication activity of the dual-SIM user device.

8. The one or more non-transitory computer-readable media of claim 7, wherein the determining that a scam call alert service fits the network communication activity includes:

retrieving from a call log of the dual-SIM user device a list of telephone numbers for calls that are received via the default wireless carrier network in a predetermined time period;

comparing the list of telephone numbers to a list of known scam telephone numbers that are stored in a database of the alternative wireless carrier network to determine a number of known scam telephone numbers in the list of telephone numbers; and determining that the scam call alert service fits the network communication activity of the dual-SIM user device when the number of known scam telephone numbers in the list of telephone numbers exceeds a predetermined threshold value.

9. The one or more non-transitory computer-readable media of claim 6, wherein the at least one recommendation includes a recommendation to switch to at least one of an unlimited voice calling plan or an unlimited data plan provided by the alternative wireless carrier network.

10. A computer-implemented method, comprising:

monitoring, via a comparison application, network communication activity of a dual-subscriber identification module (SIM) user device as the dual-SIM user device communicates with a default wireless carrier network using a default SIM and a first baseband processor of the user device;

determining, via the comparison application, a first set of key performance indicators (KPIs) for the network communication activity on the default wireless carrier network at one or more locations;

retrieving, via the comparison application, a second set of corresponding KPIs at the one or more locations for an alternative wireless carrier network from a KPI database of the alternative wireless carrier network using an alternative SIM and a second baseband processor of the dual-SIM user device; and comparing the first and second set of KPIs to determine one or more network performance features of the alternative wireless carrier network that are superior to the corresponding network performance features of the default wireless carrier network at the one or more locations.

11. The computer-implemented method of claim 10, further comprising at least one of:

presenting, via the comparison application, the one or more network performance features of the alternative wireless carrier network that are superior on a display of the dual-SIM user device; or presenting, via the comparison application, at least one recommendation based on the one or more performance features of the alternative wireless carrier network on the display of the dual-SIM user device.

12. The computer-implemented method of claim 10, wherein the one or more network performance features that are superior include a higher network data throughput rate, a lower network latency, a lower audio call drop rate, or a higher network signal strength at one or more locations, and the at least one recommendation includes a recommendation to subscribe to the alternative wireless carrier network.

13. The computer-implemented method of claim 12, wherein the at least one recommendation includes a recommendation to subscribe to the alternative wireless carrier network for use at one or more locations where the one or more network performance features of the alternative wireless carrier network are superior.

14. The computer-implemented method of claim 10, further comprising:

determining, via the comparison application, one or more service enhancement features of the alternative wireless carrier network fit the network communication activity of the dual-SIM user device; and presenting, via the comparison application, at least one recommendation based on the one or more service enhancement features.

15. The computer-implemented method of claim 14, wherein the determining the one or more service enhancement features includes determining that an unlimited data or voice calling service, a scam call alert service, or a bundled free media content streaming service fits the network communication activity of the dual-SIM user device.

16. The computer-implemented method of claim 10, wherein the at least one recommendation includes a recommendation to switch to at least one of an unlimited voice calling plan or an unlimited data plan provided by the alternative wireless carrier network.

17. A dual-subscriber identification module (SIM) user device, comprising:
one or more processors; and
memory including a plurality of computer-executable components that are executable by the one or more processors to perform a plurality of acts, the plurality of acts comprising:
monitoring network communication activity of the dual-SIM user device as the dual-SIM user device communicates with a default wireless carrier network using a default SIM and a first baseband processor of the user device, the network communication activity including a download or an upload of IP data packets by the first baseband processor;
determining a first set of key performance indicators (KPIs) for the network communication activity on the default wireless carrier network;
initiating a simulation of the network communication activity on an alternative wireless carrier network by repeating the download or the upload on the alternative wireless carrier network using equivalent dummy IP data packets via an alternative SIM and a second baseband processor of the dual-SIM user device;
determining a second set of KPIs for the simulation of the network communication activity on the alternative wireless carrier network; and
comparing the first and second set of KPIs to determine one or more network performance features of the alternative wireless carrier network that are superior to the corresponding network performance features of the default wireless carrier network.

18. The user device of claim 17, wherein the plurality of acts further comprise at least one of:
presenting the one or more network performance features of the alternative wireless carrier network that are superior on a display of the dual-SIM user device; or
presenting at least one recommendation based on the one or more performance features of the alternative wireless carrier network on the display of the dual-SIM user device.

19. The user device of claim 17, wherein the plurality of acts further comprise:
determining that one or more service enhancement features of the alternative wireless carrier network fit the network communication activity of the dual-SIM user device; and
presenting at least one recommendation based on the one or more service enhancement features.

20. The user device of claim 19, wherein the at least one recommendation includes a recommendation to subscribe to the alternative wireless carrier network.

* * * * *